(12) United States Patent
Mbarki

(10) Patent No.: US 6,732,299 B1
(45) Date of Patent: May 4, 2004

(54) WARM START SOFTWARE RECOVERY

(75) Inventor: Imed E Mbarki, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/521,528

(22) Filed: Mar. 8, 2000

(51) Int. Cl.⁷ .............................................. G06F 11/00
(52) U.S. Cl. ................... 714/36; 714/21; 713/2
(58) Field of Search ..................... 714/36, 21, 23, 714/24; 713/2

(56) References Cited

U.S. PATENT DOCUMENTS

| | | | | |
|---|---|---|---|---|
| 5,421,006 A | * | 5/1995 | Jablon et al. ................. | 714/36 |
| 5,430,866 A | * | 7/1995 | Lawrence et al. ............ | 714/20 |
| 5,935,242 A | * | 8/1999 | Madany et al. ................ | 713/1 |
| 6,009,541 A | * | 12/1999 | Liu et al. ...................... | 714/36 |
| 6,026,499 A | * | 2/2000 | Shirakihara et al. .......... | 714/11 |
| 6,134,655 A | * | 10/2000 | Davis ............................. | 713/1 |
| 6,513,075 B1 | * | 1/2003 | Perkel et al. .................. | 710/8 |
| 6,665,758 B1 | * | 12/2003 | Frazier et al. ............... | 710/200 |

* cited by examiner

*Primary Examiner*—Robert Beausoliel
*Assistant Examiner*—M Duncan

(57) ABSTRACT

A warm start of a system is initiated with a warm start manager disabling incoming signals to the system and initiating at least a two-phase warm start procedure. In the first phase, being an intra-process phase, each process is checked for integrity of its own data structures. When data structures fail this check and cannot be recovered, a cold start is initiated. In the second phase, being an inter-process phase, entities that each process owns are checked to ensure that all other processes have a consistent image of the entities. Those entities that do not have a consistent image across the processes are removed. In an optional third phase of the warm start procedure, a determination is made as to which of the removed entities can be recreated immediately, and those entities are recreated.

15 Claims, 3 Drawing Sheets

WARM START SOFTWARE RECOVERY

BACKGROUND

This invention relates to initializations of computer systems and, more particularly, to warm starts.

When a computer system is turned on, it initiates what is called a cold start. A cold start involves initializing the software and the hardware to an initial state. Every time the cold start happens, the system is initialized to the exact same initial state.

A warm start, in contradistinction, can happen only after the system is up and running. When a warm start happens, the hardware is not reinitialized as in a cold start. In general, the hardware is checked to make sure that it is in a sane state. Also, the software is not initialized after a warm start but, rather, the software checks itself for consistency and sanity and attempts to correct any encountered problems. What is important is that the rest of the system software (drivers, platform, and application software) keeps the system state across the warm start.

Warm start is a technique used when providing redundancy and fault tolerance for a particular computing machine. When a critical/unrecoverable error happens, such system attempts a warm start that would clear the error without disrupting the established services. For example, if one is talking over the phone to someone else and a warm start happens on one of the switches that are carrying such call. Both parties in the phone conversation should not notice it. They keep talking to each other without service interruption.

A warm start can be controlled or uncontrolled. In a controlled warm start, a process running on the controller might decide that the system is too unstable to keep running as it is and that warm start should be performed in order to attempt to correct the errors. Alternatively, there is the uncontrolled warm start. For example, if a system has primary controller and standby (redundant) controller, when the primary controller goes bad the secondary controller becomes active. This transition can be achieved through the use of the warm start technique (among other choices). If, however, the primary controller suddenly fails, or a user physically takes out the primary controller, that would force the standby controller to undergo warm start. In this case, the software did not have any control on when the warm start happened, and such a warm start is called an uncontrolled warm start.

Thus, a warm start is a start that is that does not reset, or initialize, all variables. If the warm start is not done carefully, the system might crash, thus defeating the success of the warm start, since the service will be disrupted (in previous phone call example: both parties will all of sudden get disconnected from each other and the phone call is terminated).

SUMMARY OF THE INVENTION

In accordance with the principles disclosed herein, when a warm start is initiated, control passes to a managing task. The managing task disables all interactions of the switch controller with other switches or routers, informs the switch's I/O modules that a warm start has been initiated, and proceeds with a two phase boot-up. In the first phase, each process of the controller checks its own internal data structures to make sure that they are consistent. The checks are made seriatim by means of a token that the managing task circulates. During this phase a process is not allowed to talk to any other process except the managing task. When a process gets the token it does its own internal checking, then returns the token to the managing task. If it is determined that there are inconsistencies in a data structure of a process, the process tries to fix them. If that cannot be done, it is concluded that the error is unrecoverable and a cold start is initiated. During this phase, the system checks only for very critical errors that, if not recoverable, the system cannot continue the warm start. The second phase, which follows a successful completion of the first phase, checks are again done on the processes, seriatim, by means of a token that the managing task circulates. In this phase each process makes sure that any entity that it is managing is an acceptable state, in the sense that images of the entity across all processes are consistent. If it is not, then the process deletes the entity from the system.

DETAILED DESCRIPTION

Figure 1:
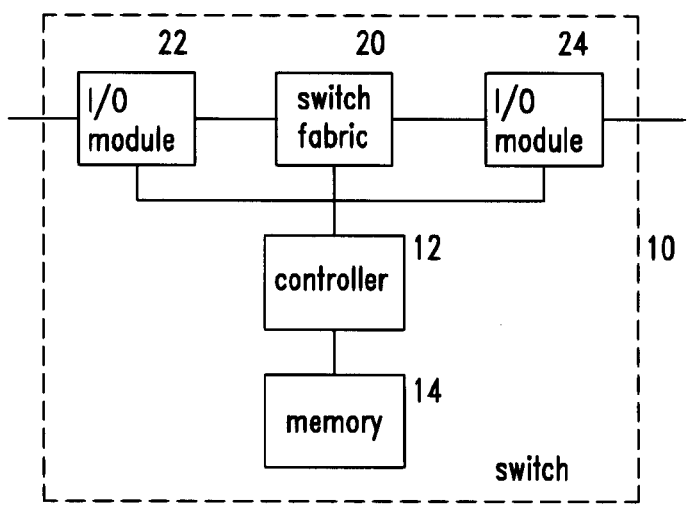
FIG. 1 presents a general block diagram of a switch.

FIG. 1 presents a generalized block diagram of a switch, in connection with which the principles disclosed herein may be applied. The switch contains I/O module banks 22 and 24 that are connected to switching fabric 20. Calls flow through switch 10 from, for example, an I/O module in bank 22, through the switching fabric, and out through an I/O module in bank 24. The particular output I/O module through which a particular call exits switch 10 is under control of controller 12. Controller 12 is a stored program controlled processor, and the software that drives controller 12 resides in memory 14.

Figure 2:
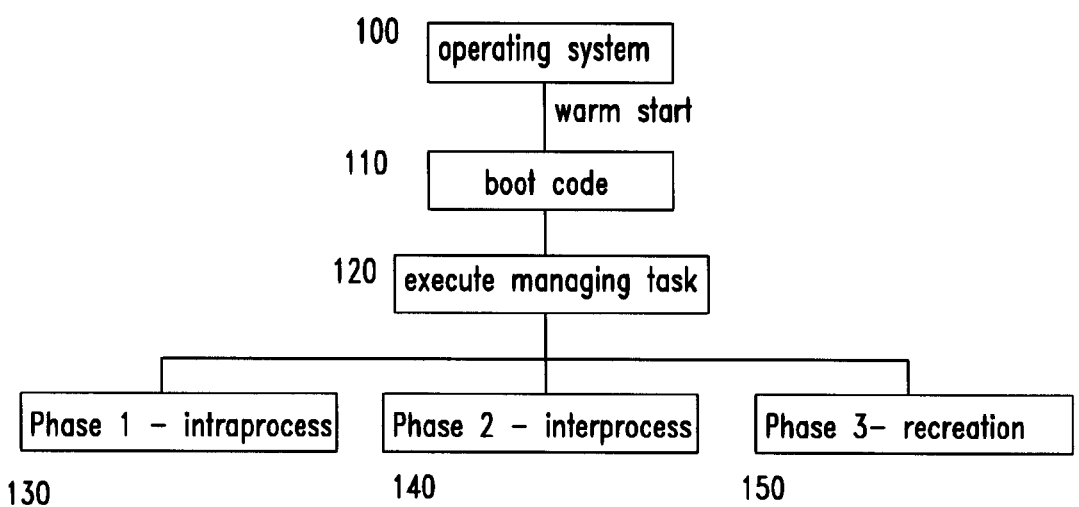
FIG. 2 presents a flow chart of a warm start process in accordance with the principles disclosed herein.

Under normal conditions, switch 10 controls the connections of calls. At times, an error can occur which may be based in some software flaw, or some hardware flaw. Not all errors cause catastrophic results and, therefore, an error-watch process that is active in the system responds to most of the errors by merely logging the errors in an error-log file. With respect to certain errors, however, the error-watch process concludes that it is in an unstable state and elects to undergo a warm start. When a warm start condition arises, in accordance with the principles disclosed herein a process is triggered as depicted in FIG. 2. More specifically, when a warm start condition arises, control passes from the normal operation of the switch (block 100) to step 110. In step 110, the controller executes a boot-up process where in it performs basic sanity checks of the switch hardware and basic operating system software modules, and deactivates all connections to the outside world. Internal connections to the I/O module are kept active. Deactivating a connection means that it still exists in the switch: the hardware is still programmed with that connection and the software (hardware driver) is still programmed with the connection. However, traffic incoming on that connection is discarded. An important check that is made at step 110 is of the driver that controls the hardware. It is important thing is to make sure that the driver controlling the hardware is in a sane state (for example: lists managed by a driver are not corrupt). Some nominal hardware checks can optionally be undertaken at step 110, with the hardware driver reading status registers of the hardware. In some systems, the operating system can be initialized after a warm start as well. This is achieved in systems where non Operating System software manages its own memory and buffers, instead of relying on the Operating System. When the boot-up process is unsuccessful, an alarm is generated that causes a full-blown reboot of the system (as compared to a warm start). When the boot-up process is successful, a "warm-start-management" task (WSM task) is initiated and it control passes to step 120, which begins a phase 1 warm start process 130. The phase 1 warm start process 130 is an intra-process check. When it completes successfully, the WSM task begins a phase 2 warm start process 140, which is an inter-process check. When process 130 does not complete successfully, a cold start boot-up is initiated. When phase 2 warm start process 140 completes, the WSM task ends with process 140.

Figure 3:
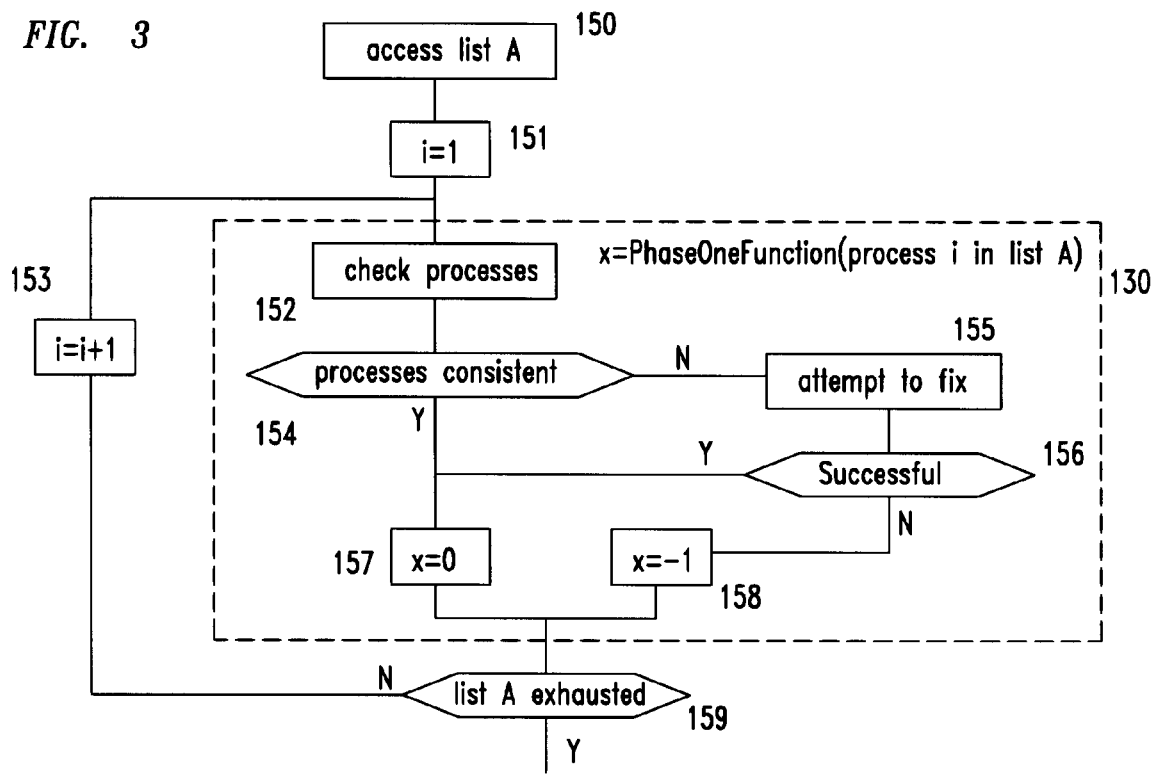
FIG. 3 presents a flow chart of an intra-process checking procedure.

FIG. 3 presents a flow chart of the phase 1 intra process checking procedure. It is controlled by WSM task in a manner that it is effectively token-based. A process is not checked until the WSM initiates a checking task. In the illustrative embodiment disclosed in FIG. 3, the phase 1 checking procedure begins in step 150 where the WSM task retrieves a list of processes (list A) from memory 14. List A is an ordered list, with the order selected by the person(s) charged with implementing the warm start. Having gained access to list A, control passes to step 151 where a running variable, i, is set to 1 and the WSM task calls the function PhaseOneFunction(J) which, as with all conventional function calls, is designed to return a value to the WSM task. This, effectively, is the token that is returned to the WSM task, as described below. J corresponds to process i of list A and, hence, the PhaseOneFunction(J) is function-specific.

Function PhaseOneFunction(J) is a function that is responsible for the process initialization. Within this function step all data structures that are employed by process J are checked for consistency in step 152 (in contrast to being corrupted). When step 154 finds that all data structures of process J were found to be consistent by step 152, control passes to step 157, which sets the return value of the PhaseOneFunction(J) to 0, returning control to the WSM task. When step 154 indicates that some data structures are corrupted, control passes to step 155 where the PhaseOneFunction(J) attempts to fix the data corrupt structures. Step 155 can be fairly simple, or quite sophisticated. In its simple embodiment, step 155 can simply re-initialize process J. More sophisticated embodiments may be re-initialize only the corrupted data structures. To give an example, if a warm start happens in the middle of a link list manipulation, a pointer may be left dangling. There are certain techniques that are known in the computer science art that allow the code to recover from such corruption. To illustrate one such technique, the linked list manipulation may be carried out in a transaction-based approach: "write", then "commit". That is, the "write" is done in such a way that it can be undone, if it is aborted in the middle of an operation, such as when a warm start is executed before the "commit" operation. When the function is successful, control passes to step 157. Otherwise, control passes to step 158, which sets the return value of the PhaseOneFunction(J) to −1, returning control to the WSM task.

When control returns to the WSM task, step 159 ascertains whether list A has been exhausted. If so, the process terminates. Otherwise, the running variable, i, is incremented in block 153, and another function call is made.

When the phase 1 checking procedure of FIG. 3 exits because all processes in list A have been checked, the WSM task initiates the phase 2 inter-process checking procedure 140.

Figure 4:
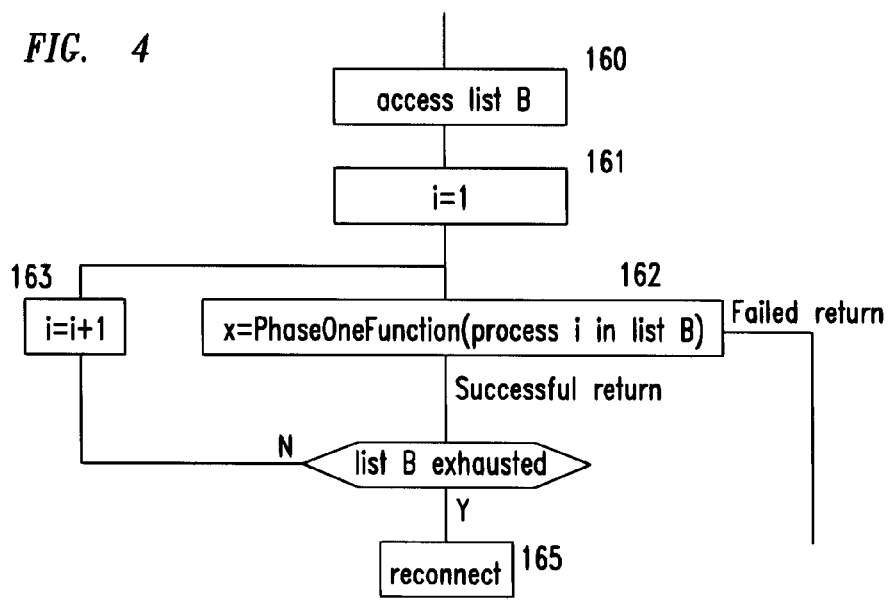
FIG. 4 presents a flow chart of an inter-process checking procedure.

FIG. 4 presents a flowchart of the phase 2 inter-process checking procedure. This procedure, like the phase 1 procedure, begins with a retrieval of a list. In step 160, a list B is retrieved, which comprises an ordered list of processes. The order may be the same as in list A, but it is not required to be so. Control then passes to step 161 where running variable i is set to 1, and control is passed to step 162. At step 162 the WSM task executes a function call PhaseTwoFunction(J), where J corresponds to process i in list B. Function PhaseTwoFunction(J) focuses on entities that it manages (an entity is typically embodied in a data structure of a process), and checks that processes that are aware of this entity have a consistent image of this entity. For example a system to which the principles of this invention are applied may have a configuration manager process that controls, or owns, the I/O ports entity and, for example, 5 other processes that keep certain information about the I/O ports. Obviously, they all have to agree whether a certain port exists or not, whether a certain port is active or inactive and so on. In accordance with the principles disclosed herein, only the configuration manager process is responsible for the checking the I/O ports entity after a warm start happens. First, the configuration manager process decides whether which I/O ports need to be checked. Only ports that were in the middle of an operation when a warm start happened need to be checked. If such ports exist, the configuration manager process makes sure that all the processes that kept information about the ports agree with the view of the ports held by the configuration manager. When the images that other processes have of entities that are in agreement with the images of entities for which PhaseTwoFunction(J) is responsible for (following a fixing effort, if necessary), the return value of step 162 corresponds to a "successful" completion, for example, 0. Otherwise the return value of step 162 corresponds to a "failed" completion, for example, −1. When the WSM task received a successful return value, step 164 ascertains whether list B has been exhausted. If so, the process terminates and control passes to step 165, where the previously disabled connections are reopened to the "outside world" and the system returns to its normal operation. When it is determined that list B has not been exhausted, control passes to step 163, which increments the running index and calls the next PhaseTwoFunction(J), J corresponding to process i in list B.

Figure 5:
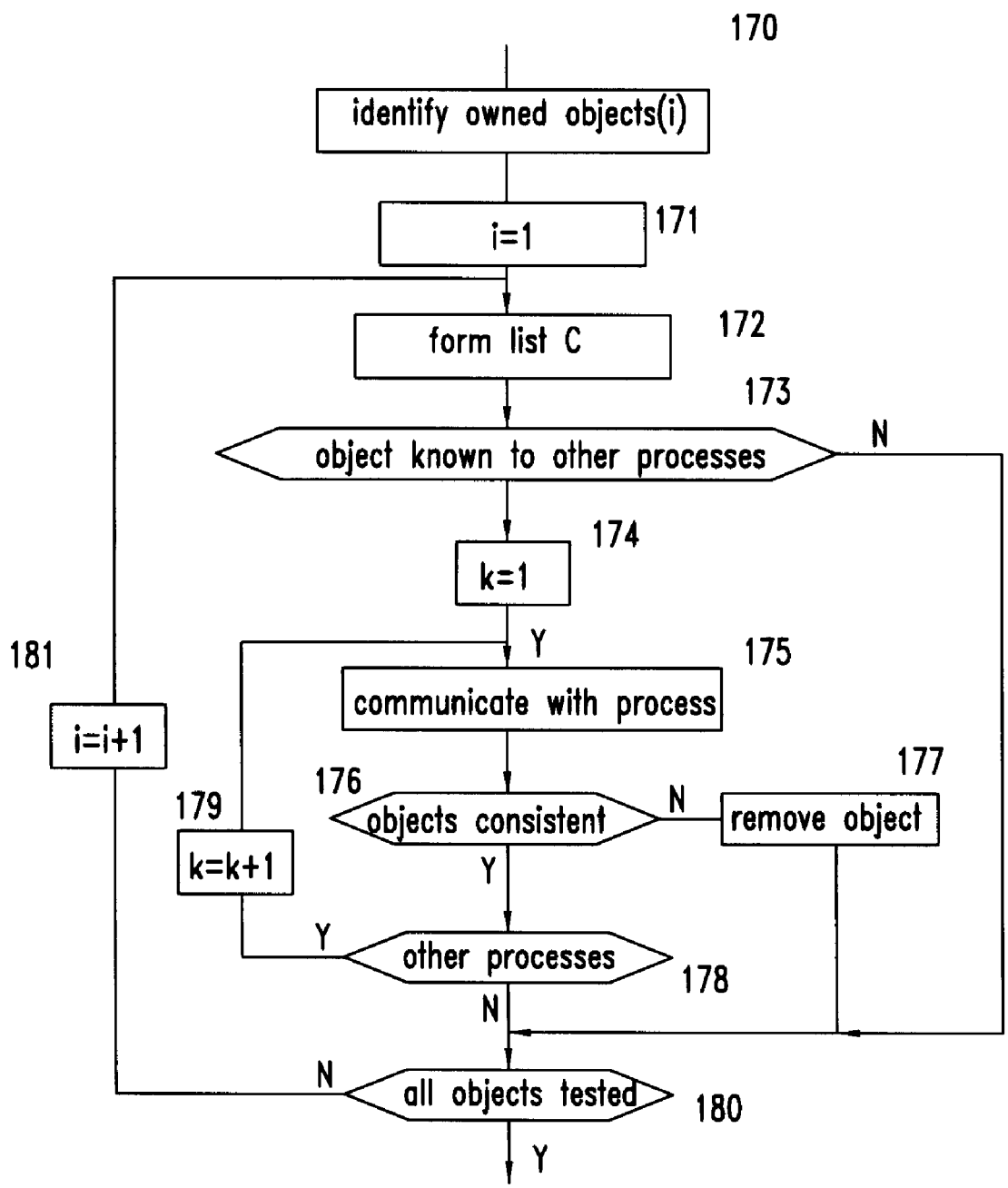
FIG. 5 presents a flow chart of the PhaseTwoFunction of FIG. 4.

FIG. 5 presents a flowchart of the PhaseTwoFunction(J) procedure of step 163. When the PhaseTwoFunction(J) begins for a particular process J, step 170 identifies all data structures (i.e., entities) that process J owns (i.e., is responsible for). These entities form a list of entities, entity(i), where i is a running variable. Control then passes to step 171, where the running variable i is set to 1 and control is passed to step 172. Step 172 consults the information about entity(i), forms a list C that contains the identities of other processes that have an image of entity(i) and passes control to step 173. Step 173 determines whether list C is empty, which would mean that no other processes have an image of entity(i). If list C is empty, control passes to step 180. If list C is not empty, control passes to step 174 where running variable k is set to 1 and control is passed to step 175. Variable k identifies entries in list C. Step 175 communicates with the process identified by variable k in list C (process k) and obtains information about the image of entity(i) in process k. Control then passes control to decision step 176, which determines whether the image of entity(i) in process k is consistent with image of the entity in the process that owns entity(i). If so, control passes to decision block 178. Step 178 determines whether list C has been exhausted. If not, control passes to step 179, where the running variable k is incremented and control returns to step 175. When list C is determined to have been exhausted in step 178, control passes to step 180.

When decision step 176 determines that the entity(i) image in process k does not correspond to the image of entity(i) in the process that owns entity(i), control passes to step 177. Step 177 removes entity(i) from the process that owns it, as well as from all processes in list C that contain an image of entity(i), and passes control to step 180. Step 177 also maintains a record of the entities that it removes.

Finally, step 180 ascertained whether all entities that are owned by the process that triggered the procedure of FIG. 5 have been considered. If not, control passes to step 181 which increments the running variable i, and returns control to step 172. Otherwise, the FIG. 5 procedure terminates.

Termination of the FIG. 5 procedure returns control to the WSM task. When all processes complete the phase 2 warm start, phase 3 warm start process 140 is initiated. Process 140 attempts to recreate the entities that were removed by step 177, in the same manner that an entity is normally created in system 10. That is, an entity that is normally known to different processes is usually created by the owner process orchestrating the creation of the entities in all of the relevant processes. Some entities are dynamic, and the owner process might not be able to create such entities. That is acceptable. The FIG. 10 system is in a recovered, stable, state and the necessary entities will be created in the normal course of operation. For example, such entities may represent a service that was being established, but the establishment was not completed because of the warm start. While the partial establishment of the service might be recovered, the entity that seeks to establish the service (be it an operations or some networking equipment) will retry, and the service will thus be established. Those entities that the owner processes can recreate are recreated. It is noted that in during the phase 3 process, connections are open, and signals from outside system 10 are accepted. Once the phase 3 process completes, system 10 is fully recovered and normal operation resumes.

What is claimed is:

1. A method for effecting a warm start of a software controlled apparatus comprising the steps of:

initializing a warm start process;

executing an intra-process checking procedure that checks integrity of data structures of processes contained in a preselected list of processes; and executing an inter-process checking procedure to insure that all entities are consistent across all processes of said list.

2. The method of claim 1 where said step of executing an inter-process checking procedure follows said step of executing an intra-process checking procedure.

3. The method of claim 1 wherein said step of initializing a warm start process includes a step of disabling all connection to outside said apparatus.

4. The method of claim 3 further comprising a step, following said step of executing an inter-process, of enabling connection from outside of said apparatus.

5. The method of claim 1 where said step of initializing a warm start process includes a step of executing a warm start manager task that manages said intra-process checking procedure and, following completion of said intra-process checking procedure, manages said inter-process checking procedure.

6. The method of claim 5 where said warm start manager task manages said intra-process checking procedure by checking processes of said apparatus, one at a time, pursuant to a first prearranged list.

7. The method of claim 6 where the warm start manager task manages said intra-process checking procedure by selecting a process from said first list enabling a function focused on the selected process that checks integrity of data structures within the selected process;

receiving a return value from said function that indicates whether said function reached a positive conclusion about said integrity of said data structures, as contrasted to a negative conclusion about said integrity of said data structures, acting on nature of said returning token.

8. The method of claim 7 where said step of acting on nature of said returning token comprises initiating a cold start of said apparatus when said returning token indicates that said function reached a negative conclusion about said integrity of said data structures, and selecting another process and returning to said step of enabling a function when said returning token indicates that said function reached a positive conclusion about said integrity of said data structures.

9. The method of claim 7 wherein said function that is focused on the selected process attempts to correct inconsistent data structures and produces said negative conclusion only when the attempt to correct inconsistent data structures is unsuccessful.

10. The method of claim 5 where said warm start manager task manages said inter-process checking procedure by checking processes of said apparatus, one at a time, pursuant to a second prearranged list.

11. The method of claim 10 where the warm start manager task manages said inter-process checking procedure by selecting a process from said second list enabling a function focused on the selected process that, with respect to entities that it owns, the function checks whether all processes have a consistent image of said entities, and removes entities from said software of said apparatus that have an inconsistent image, and returning to said step of selecting to select a next process from said second list.

12. The method of claim 11 further comprising a step of identifying entities that were removed in said step of enabling a function that may be recreated immediately.

13. The method of claim 12 further comprising a step of recreating said entities that may be recreated immediately.

14. The method of claim 1 further comprising a step of entity recovery, following said step of executing an inter-process checking procedure.

15. The method of claim 14 where said step of entity recovery comprises a step of identifying entities that are removed in said step of executing an inter-process checking procedure.

* * * * *